United States Patent [19]
Knee et al.

[11] Patent Number: 5,640,210
[45] Date of Patent: Jun. 17, 1997

[54] HIGH DEFINITION TELEVISION CODER/ DECODER WHICH DIVIDES AN HDTV SIGNAL INTO STRIPES FOR INDIVIDUAL PROCESSING

[75] Inventors: Michael James Knee, Guildford; Nicholas Dominic Wells, Brighton, both of United Kingdom

[73] Assignee: British Broadcasting Corporation, London, United Kingdom

[21] Appl. No.: 439,702

[22] Filed: May 12, 1995

Related U.S. Application Data

[63] Continuation of Ser. No. 274,304, Jul. 12, 1994, abandoned, which is a continuation of Ser. No. 761,956, Nov. 14, 1991, abandoned.

[30] Foreign Application Priority Data

Jan. 19, 1990 [GB] United Kingdom ............ 9001296

[51] Int. Cl.⁶ .................. H04N 7/04; H04N 7/12; H04N 11/02
[52] U.S. Cl. .................. 348/469; 348/390; 348/420; 348/426
[58] Field of Search .................. 348/469, 441, 348/384, 390, 420, 426, 400–419; H04N 7/04, 7/12, 11/02

[56] References Cited

U.S. PATENT DOCUMENTS

| | | | |
|---|---|---|---|
| 4,424,532 | 1/1984 | den Toonder et al. | 358/120 |
| 4,675,722 | 6/1987 | Hackett | 358/13 |
| 4,985,767 | 1/1991 | Haghiri et al. | 358/133 |

FOREIGN PATENT DOCUMENTS

| | | | |
|---|---|---|---|
| 0 322 955 | 7/1989 | European Pat. Off. | H04N 7/00 |
| 2 002 999 | 6/1978 | United Kingdom | H04N 1/00 |
| 2 188 510 | 9/1987 | United Kingdom | H04N 7/13 |

Primary Examiner—John K. Peng
Assistant Examiner—John W. Miller
Attorney, Agent, or Firm—Robert F. O'Connell; Kevin J. Fournier; Milton Oliver

[57] ABSTRACT

High definition television coder/decoder a high definition coder or decoder includes a number of parallel sub-decoders or coders. The image to be coded or decoded is divided into a number of stripes, a given stripe being coded or decoded by a single sub-coder or sub-decoder. Every $N^{th}$ stripe is coded or decoded by the same sub-coder/sub-decoder, where N is the number of sub-coders or sub-decoders. The number of sub-coders is independent of the number of sub-decoders whereby a reduction in the number of sub-coders with increasing bit-rate capacity does not necessitate a change in decoder.

10 Claims, 5 Drawing Sheets

| | |
|---|---|
| Coded HDTV Stripe n | - to Sub-decoder 1 |
| Coded HDTV Stripe n +1 | - to Sub-decoder 2 |
| Coded HDTV Stripe n +2 | - to Sub-decoder 3 |
| Coded HDTV Stripe n +3 | - to Sub-decoder 4 |
| Coded HDTV Stripe n +4 | - to Sub-decoder 1 |
| Coded HDTV Stripe n +5 | - to Sub-decoder 2 |
| Coded HDTV Stripe n +6 | - to Sub-decoder 3 |
| Coded HDTV Stripe n +7 | - to Sub-decoder 4 |
| Coded HDTV Stripe n +8 | - to Sub-decoder 1 |
| Coded HDTV Stripe n +9 | - to Sub-decoder 2 | under
HIGH DEFINITION TELEVISION CODER/ DECODER WHICH DIVIDES AN HDTV SIGNAL INTO STRIPES FOR INDIVIDUAL PROCESSING This is a Continuation of application Ser. No. 08/274,304 filed Jul. 12, 1994 abandoned, in which is Continuation Application of abandoned prior application Ser. No. 07/761, 956, filed Nov. 14, 1991.

BACKGROUND OF THE INVENTION

1. Field of the Invention

This invention relates to high definition television (HDTV) and in particular to a coder and decoder for HDTV signals.

2. Description of Related Art

There has been proposed an HDTV coder/decoder (usually referred to as a codec) which consists of six parallel conventional definition (CDTV) bit-rate reduction codecs in parallel (i.e. six sub-codecs). Each codec operates on an appropriate block of picture area and the HDTV codec can operate at 140 Mbit/S. Although this proposal is attractive, it has the disadvantage that if it were to be adopted as a standard, any future implementation would have to consist of six parallel codecs. This standard may not be efficient when the speed of single codecs is increased to the point where an HDTV codec could be implemented with fewer parallel paths.

SUMMARY OF THE INVENTION

The present invention aims to overcome the problem with the existing proposal and in its broadest form provides a codec which may be implemented with any number of parallel sub-codecs and in which a coder with a given number of coding paths is compatible with a decoder with a different number of decoding paths.

In accordance with one aspect of the invention sub codecs operate on a stripe-by-stripe basis rather than a block-by-block basis.

In another aspect of the invention the motion compensation/estimation function of each codec is arranged to have access to information from adjacent stripes.

The invention also provides for resynchronisation of the decoder independently of coder buffers. Furthermore, the invention provides for monitoring of the total buffer occupancy of the coder to ensure that it does not exceed a pre-defined maximum value.

The invention is defined in the claims to which reference should now be made.

We have appreciated that to achieve the aim set out, each sub-codec must operate on a stripe of picture rather than a block of picture as suggested in the prior art proposal. Thus, the solution is based on a stripe-by-stripe rather than a block-of-picture by block-of-picture approach.

BRIEF DESCRIPTION OF THE DRAWINGS

An embodiment of the invention will now be described with reference to the accompanying drawings in which.

DESCRIPTION OF THE PREFERRED EMBODIMENTS

For the purposes of the following description, an HDTV coder can be considered to consist of N sub-coders in parallel. Sub-coder i will process stripes i, i+N, i+2N etc within any given frame; that is, every $N^{th}$ stripe. The clock rate in each sub-coder is inversely proportional to the total number of sub-coders.

Figure 1:
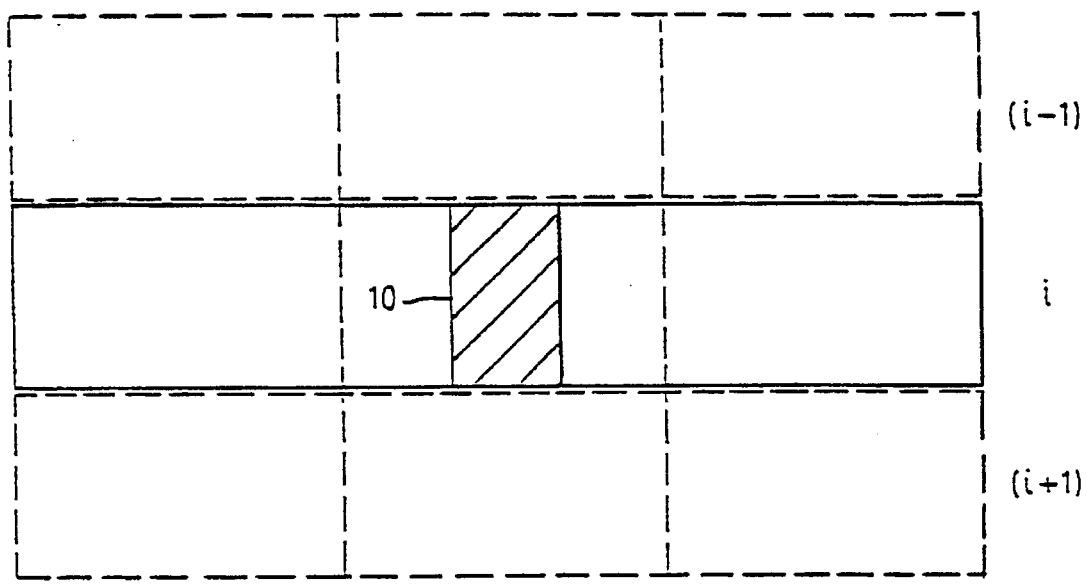
FIG. 1 illustrates the stripe-by-stripe coding/decoding approach.

In order that the motion in any given stripe may be measured using block matching techniques, as described for example in our published application GB2188510. The sub-coder for any given stripe will be required to have access to adjacent stripe information from the previous frame coded by the previous and subsequent sub-coders (i−1) and (i+1). This is illustrated in FIG. 1 in which the stripe processed by sub-coder i is shown by a solid line. The current block the motion of which is to be measured is shaded block 10. By determining the position of this block in the previous frame, a motion vector can be assigned to the block and its position estimated for the next free. A similar operation must be performed by the sub-decoders.

Figure 2:
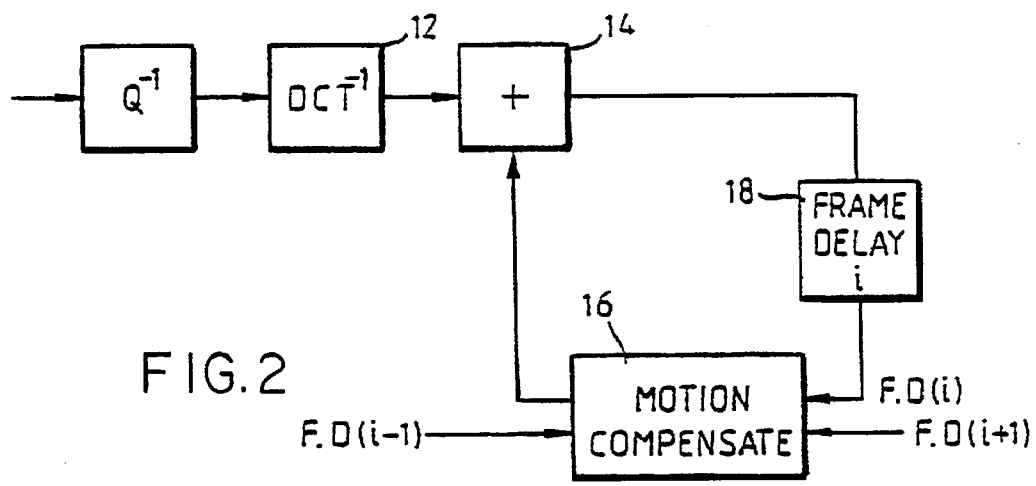
FIG. 2 shows a block diagram of a sub-decoder illustrating how motion compensation may be achieved.
Figure 3:
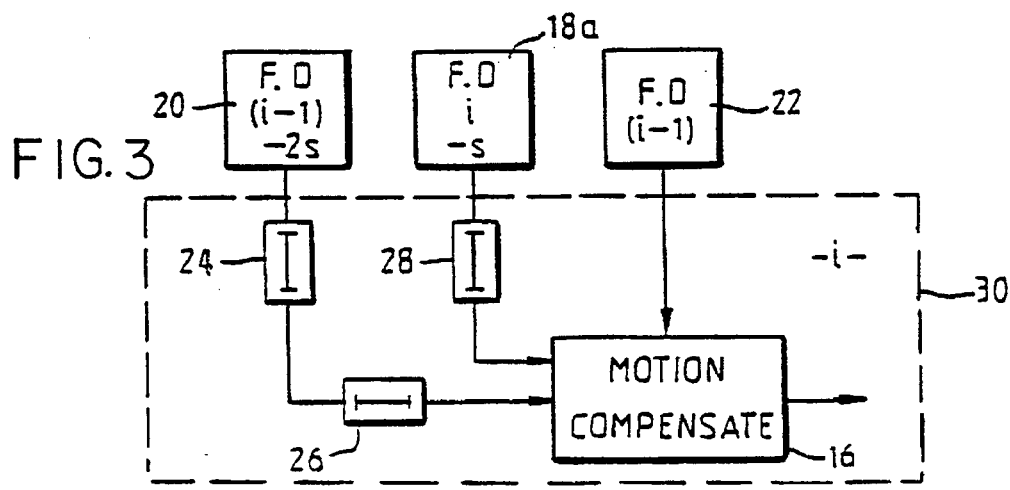
FIG. 3 shows a block diagram of a sub-decoder showing additional delays required to implement stripe-by-stripe decoding.

FIGS. 2 and 3 show how a sub-decoder will use the additional previous frame inputs. The motion estimation function of each sub-coder will similarly require the same three inputs. In FIG. 2 the demodulated video signal is decoded using a conventional 17/34 Mbit/S hybrid DCT decoder 12 the output of which is supplied to an adder 14. The other input to the adder is the output from the motion compensation unit 16 for stripe i. This compensation unit has supplied to it the motion compensated data from stripe i of the previous frame which is delayed by frame delay 18 and similarly motion compensated data from the adjacent stripes (i−1) and (i+1), the stripe data being delayed by respective frame delays 20 and 22 as can be seen from FIG. 3. Sub-decoder i starts to process a stripe at a time which is staggered by a delay of one stripe interval of the input HDTV signal relative to the start of stripe processing of the adjacent sub-decoders i−1 and i+1. This is illustrated in FIG. 3 by stripe delays 24, 26 and 28 which delay the output of the i−1 stripe frame delay to the motion compensation unit of stripe i by two stripe intervals (delays 24 and 26) and the output of the i stripe frame delay by one frame interval (delay 28). It should be noted that the total delay imposed by each of the frame delays and their associated stripe delays (if any) is one video frame period. Thus, in FIG. 3, the frame delay 20 has a delay length of one frame less two stripes and the frame delay 18a has a delay of one frame less one stripe.

It can be seen from FIGS. 1 to 3 that conventional CDTV codecs can be linked comparatively simply to provide an HDTV codec with full motion compensation and estimation. The only modifications required to the CDTV codec architecture occur in the provision of stripe delays in the motion compensation board illustrated by chain dotted line 30 in FIG. 3.

The previous discussion has considered problems of motion estimation and compensation in a stripe-by-stripe parallel CDTV codec for HDTV. The remaining description considers coder and decoder buffer architecture and operation and decoder resynchronisation.

CODER

For maximum commonality with the CDTV codec architecture, each sub-coder has its own sub-buffer. Thus, there will be N sub-buffers and sub-buffer i will contain the information for stripes i, i+N, i+2N and so on.

As the number of sub-coders in parallel may be different from the number of parallel sub-decoders, it is necessary that the transmission multiplex transmits a complete stripe of information from a sub-buffer output before switching to the output of the following sub-buffer. For example, stripe i from sub-buffer i must be fully transmitted before the start of transmission of stripe i+1 from sub-buffer i+1. The CDTV codecs which form the sub-codecs each have only one coding path and one buffer. The quantisation step for any one stripe is a function of the total sub-buffer occupancy. With a multi sub-buffer architecture, the quantisation step for a given stripe could be chosen to be a function of the appropriate sub-buffer occupancy or a function of the equivalent total sub-buffer occupancy ETBO where:

$$ETBO \equiv \sum_N \text{sub-buffer occupancy } (i)$$

The relationship is not exact, for it to be so each sub-coder would have to operate at full speed to complete the coding of one stripe before the following sub-coder commenced the processing of the following stripe.

A better picture quality would be obtained by adapting the quantisation step according to the ETBO. However, this gives rise to problems with individual sub-buffer underflow and overflow. A compromise solution is adopted in which the quantisation step is a function of the individual sub-buffer occupancy and the ETBO.

As well as having to be compatible with a decoder having a different number of sub-decoders, the coder must be compatible with a decoder having a single buffer. In this case, the ETBO has to be less than some specified maximum in order to prevent decoder buffer overflow and underflow.

This requirement is illustrated by the following example. Consider the case in which all the activity in a picture corresponds exactly to only those stripes coded by sub-coder i. In this case the i sub-buffer would be full and the remaining sub-buffers all empty. In such a case, albeit an unlikely one, equivalence to a system with only one coding path and buffer store would only be achieved if each sub-buffer was as large as the buffer in the single buffer coder.

Of course the above example is extreme. The optimum size of the sub-buffer is not as large as that of the single buffer coder and may suffer a small loss of picture quality performance compared with a single-loop coder implementation.

In an alternative embodiment to the multi sub-buffer solution, all sub-coder loops feed into one common buffer store one stripe at a time. However, this embodiment has the disadvantage that the common buffer store would have to accept a data input at a maximum rate of 32 bit words at 144 MHz clock rate. This embodiment is equivalent to having one coder loop operating at the HDTV clock rate and one coder buffer.

DECODER

Similarly to the $i^{th}$ sub-coder, in a decoder with N decoder sub-loops or sub-decoder in parallel, stripe i, i+N, i+2N etc. would be directed to sub-buffer i i.e. every N'h stripe is decoded by the same sub-decoder. This necessitates pre-buffer decoding of stripe synchronisation words.

Similarly to the sub-coder, the sub-decoder size can be estimated to be equal to the size of the buffer of a single buffer decoder system. Consider the case of a single loop coder (CDTV), a multi-loop decoder and a quiet picture. The coder has to send stuffing bits periodically. If the stuffing bits all coincided only with those stripes sent to a single sub-decoder, then all the transmitted bit rate would be addressed to a single sub-buffer.

Again, an alternative embodiment has a single decoder buffer followed by N decoder sub-loops. As well as suffering from the disadvantage of high bit rate encountered with the corresponding coder, the buffer output would need to provide 32-bit words at a 144 MHz clock rate, the embodiment has the further disadvantage that post buffer FIFO stores would be required to slow down the data rate for each of the sub-loops.

DECODER RESYNCHRONISATION

In bit-rate-reduction codecs employing variable bit rate coding for transmission over a fixed bit rate transmission link, it is normal to send the coder buffer occupancy periodically (e.g. every stripe) in order to enable the decoder buffer occupancy to align itself appropriately. Proper alignment of the decoder buffer assures a fixed and known delay through the system.

If the transmission rate is not fixed but varies periodically, the decoder buffer alignment becomes more complicated however it is possible to overcome the problems.

In the embodiment of the present invention described it is not appropriate to send the buffer occupancy for each sub-buffer because a) the number of sub-loops in the coder may be different from the number of loops in the decoder and b) the average transmission rate per channel is highly variable and dependent on the amount of information in each stripe (since the length of time for the transmission of stripe (i) depends on the number of coded bits in this stripe). Also, it is not possible to resynchronise an individual decoder sub-buffer from a total buffer occupancy figure.

The system embodying the invention overcomes these problems by including an absolute timing reference in the transmitted bit stream which by-passes the coder buffer. This may be done in two ways:

Firstly, a flag may be sent within the transmission multiplex frame indicating the start of a TV frame at the coder. The decoder, which knows the normal delay through the codec buffers can then set the decoder time base appropriately. If greater timing accuracy is required, then the transmission multiplex frame may include space for a pointer to indicate in which subsection of the multiplex frame the TV frame start occurred.

Secondly, a timing reference synchronisation word may be stamped into the video multiplex at the output of the coder buffer. This word may or may not be stripped from the video data as required before it enters the decoder buffer and used to set the decoder timebase.

At start up or after loss of synchronisation because of transmission errors, the decoder operates the following procedure:

i) The timing reference at the input to the decoder buffer is detected and the decoder timebase set, giving stripe and field/frame pulses etc;

ii) A stripe is pulled from the first buffer and the stripe number examined;

iii) If this number is lower than required by the timebase further stripes are pulled from the buffers (in sequence) until the stripe number is correct;

iv) If the number is greater than required, decoding of the stripe is delayed until the appropriate time as directed by the timebase;

v) A check is made to ensure that the frame sync pulse timing is correct. (The frame sync pulses is numbered to match the number of the timing reference with the number of the frame synchronising word which is part of the video MUX and which has travelled through the buffer stores).

Decoder resynchronisation is only required if there is a loss of multiplex framing because of transmission errors or because of a non-sync cut in the video source.

The embodiment described provide flexible architecture for an HDTV bit-rate reduction docoder. A coder/decoder may be constructed from any number of parallel sub-coders/decoders so long as the following four conditions are met.

Firstly, the sub-coders/decoders must operate on a stripe-by stripe rather than block-by-block basis;

Secondly, the motion estimation/compensation function of an individual sub-coder/decoder must have access to the information in adjacent stripes;

Thirdly, resynchronisation of the decoder must be achieved independently of the buffer stores, for example by inserting additional timing reference information into the transmitted bit stream; and Fourthly, the equivalent total buffer occupancy of the coder must be monitored and kept lower than a pre-defined maximum value.

The embodiment described has the advantage that a transmission standard can be defined which allows coders and decoders to be constructed with any number of units in parallel. As the speed of integrated circuits increases it will become possible to build equipment according to the standard using single loop/buffer architectures.

Moreover, the parallel sub-coder/decoder arrangement may be extended to deal with sequentially scanned signals.

Figure 4:
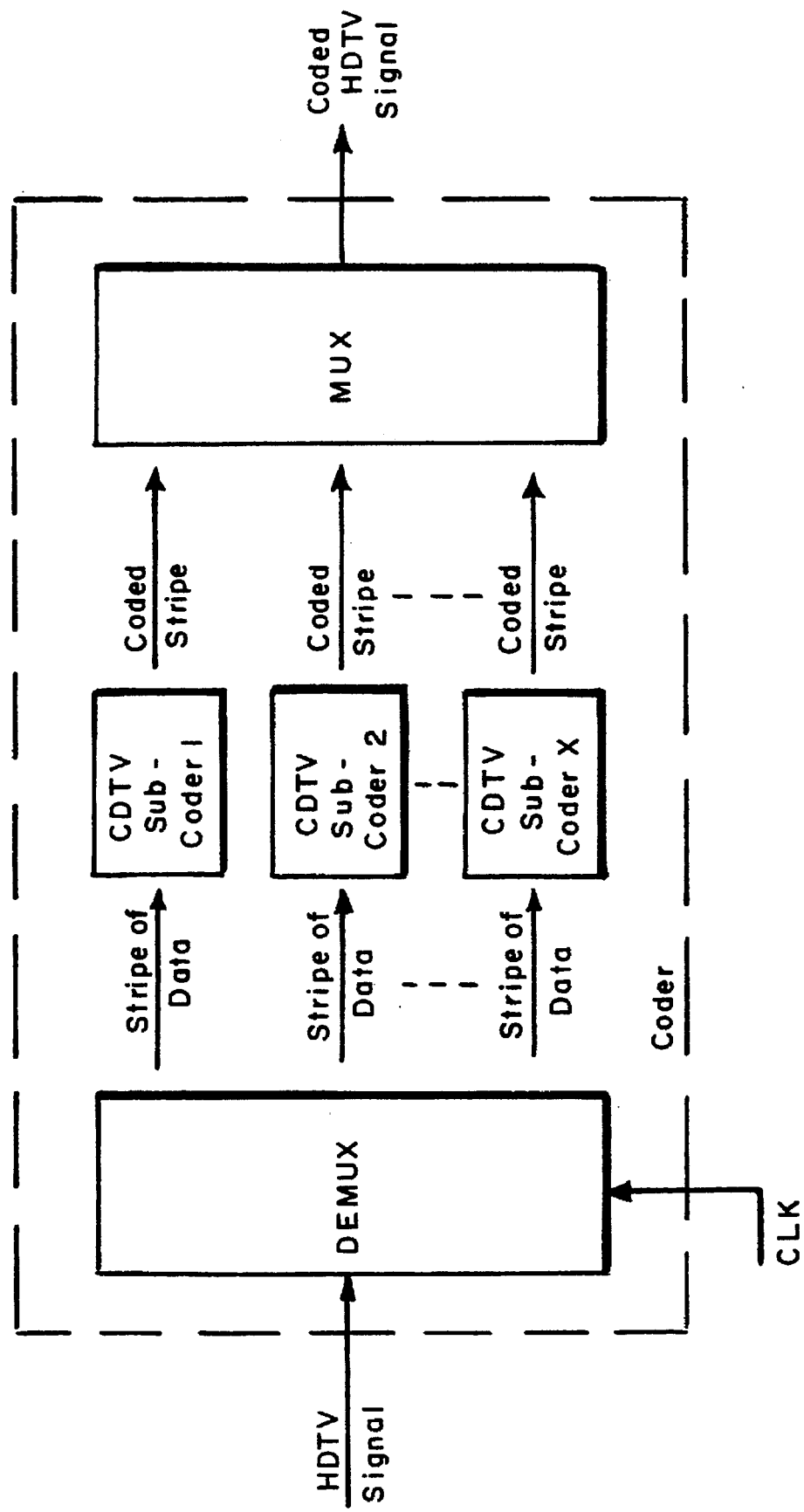
FIG. 4 shows a coder of the present invention.
Figure 5:
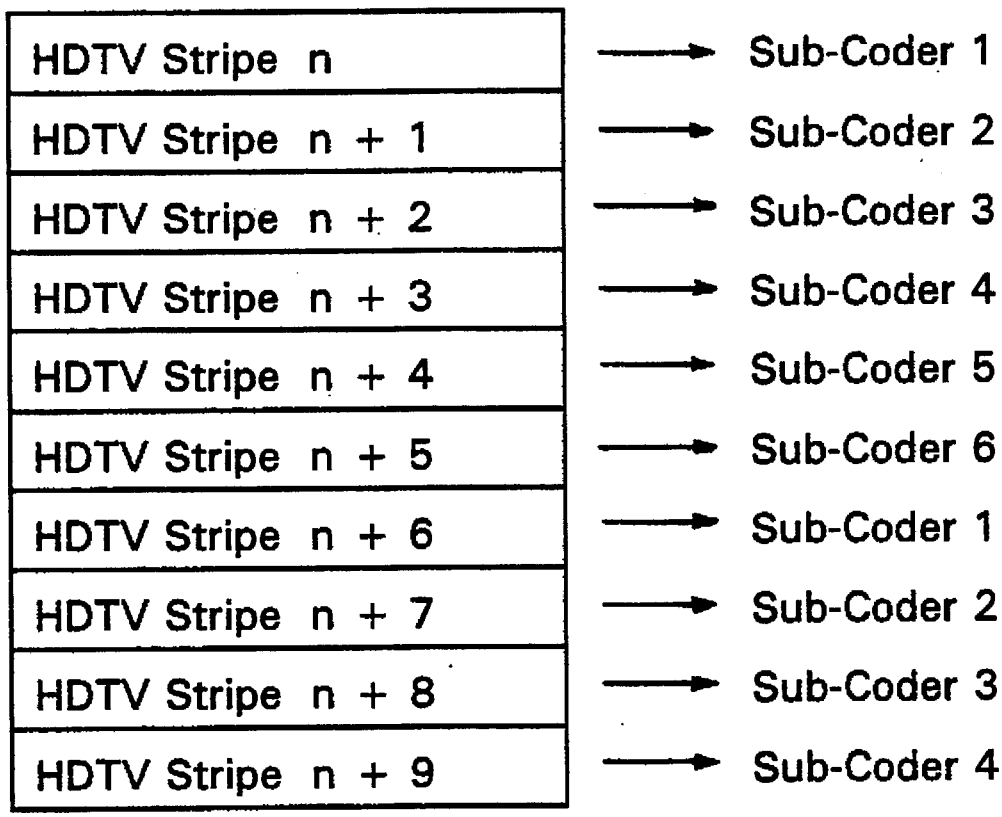
FIG. 5 is a diagram showing the coding process.
Figure 6:
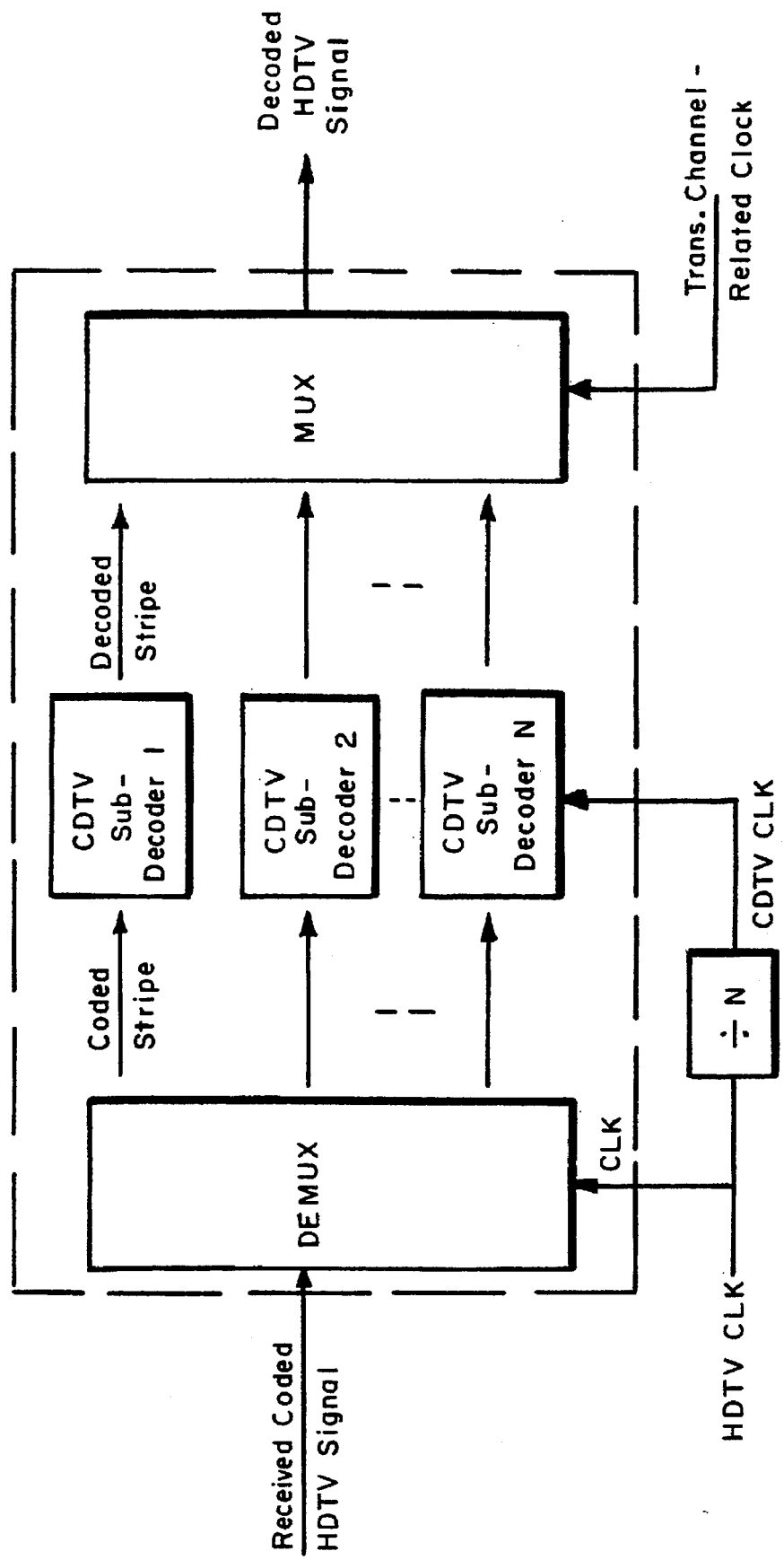
FIG. 6 shows a decoder of the present invention.
Figures 7, 8:
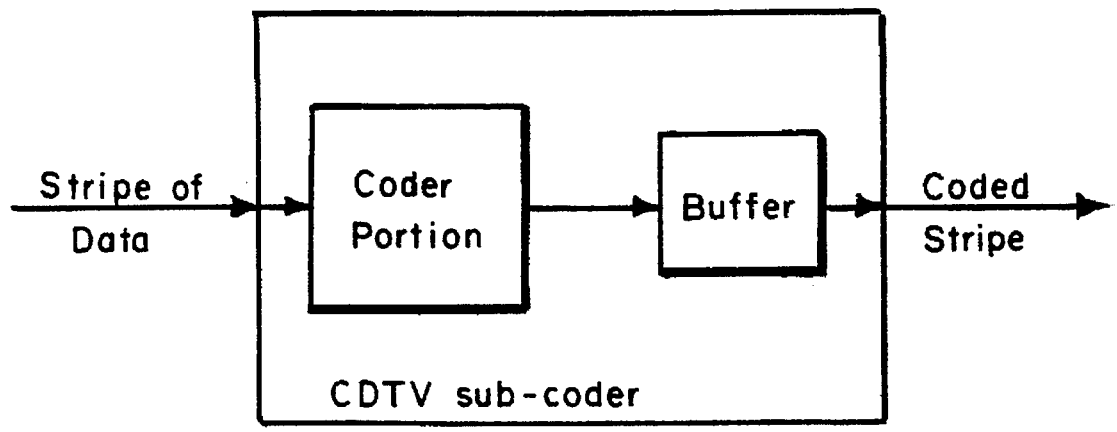
FIG. 7 shows a Prior Art Conventional Definition Television (CDTV) sub-coder.
FIG. 8 is a diagram showing the decoding process.

FIG. 4 illustrates a suitable arrangement of sub-coders arranged in parallel with each other. FIG. 5 illustrates an embodiment in which six sub-coders are used for a larger number of stripes. FIG. 6 illustrates a suitable arrangement of sub-decoders arranged in parallel. FIG. 7 illustrates schematically the internal structure of a conventional sub-coder, including a buffer. FIG. 8 illustrates an embodiment in which four sub-decoders are used for a larger number of stripes.

We claim:

1. A coder for encoding high definition television (HDTV) signals for transmission, the coder comprising a plurality of sub-coder arranged in parallel, characterised in that images to be encoded for transmission are divided into a plurality of stripes, and that each stripe is processed by an individual sub-coder, successive stripes being processed by different sub-coders.

2. A coder according to claim 1, comprising N sub-coders characterised in that every $N^{th}$ stripe is coded by the same sub-coder.

3. A coder according to claim 1, characterised in that each of the sub-coders operates at a clock rate inversely proportional to the total number of sub-coders.

4. A coder according to claim 1, wherein each of the sub-coders is a conventional definition television CDTV coder.

5. A coder according to claim 1 characterised in that each sub-coder comprises a storage buffer for holding information from the stripes of the images to be processed by the respective sub-coder.

6. A coder according to claim 5, characterised in that the buffers of the parallel coders are so arranged that the transmission multiple transmits a complete stripe of information from a given buffer before transmitting information from the buffer of the next sub-coder.

7. A decoder for decoding high definition (HDTV) television signals, comprising a plurality of sub-decoders arranged in parallel, characterised in that each sub-decoder processes video information relating to stripes of transmitted images and by means for decoding stripe synchronisation words transmitted with the video data to assign received video data to the correct sub-decoder.

8. A decoder according to claim 7 comprising N sub-decoders, characterised in that every $N^{th}$ stripe is decoded by the same sub-decoder.

9. A decoder according to claim 7 characterised in that each sub-decoder operates at a clock rate inversely proportional to the total number of sub-decoders.

10. A decoder according to claim 7 characterised in that each of the sub-decoders is a CDTV decoder.

* * * * *